United States Patent [19]

Berreby

[11] Patent Number: 5,062,957

[45] Date of Patent: Nov. 5, 1991

[54] PROCESS FOR REMOVING NITRATES FROM WATER

[76] Inventor: Edgar Berreby, 25 rue Paul Valéry, Paris, France, 75116

[21] Appl. No.: 518,467

[22] Filed: May 3, 1990

[51] Int. Cl.$^5$ ................................................. C02F 1/42
[52] U.S. Cl. ................................... 210/611; 210/631; 210/670; 210/683; 210/903
[58] Field of Search ............... 210/610, 611, 631, 668, 210/677, 683, 903, 670

[56] References Cited

U.S. PATENT DOCUMENTS 4,671,879 6/1987 Solt et al. .............................. 210/631

*Primary Examiner*—Ivars Cintins
*Attorney, Agent, or Firm*—Keil & Weinkauf

[57] ABSTRACT

A process for the selective removal of nitrates from water using a combination of an ion exchange resin and a biological purification. In the process, an ion exchanger in the sulfate form is used to selectively remove nitrate ions from the water to be treated. Following regeneration of the ion exchanger, the regeneration eluent containing the nitrates fixed by the selective resin is subjected to biological purification.

7 Claims, No Drawings ns from water using a combination of ion exchange
and biological processes.

PROCESS FOR REMOVING NITRATES FROM WATER

FIELD OF INVENTION

The invention relates to the selective removal of nitrates from water using a combination of ion exchange and biological processes.

BACKGROUND OF THE INVENTION

In many countries, the content of nitrates in natural waters has increased and continues to increase due to the extensive use of nitrate fertilizers. Since water containing too many nitrates is not potable, authorities have set maximum permissible levels for the concentration of nitrates in drinking water. For example, the European Economic Community (EEC) has established a directive which sets the desired concentration level of nitrates in potable water at 25 mg/l and the maximum admissible content level at 50 mg/l. Even these concentrations, however, must be considered excessive when the water is to be used in processes, such as in the food industry, in which the product must be concentrated. It is therefore evident that water which is to be used for preparing food must have a very low level of nitrates prior to concentration.

At the present time, several processes are known which allow nitrate removal from water. The known processes include both biological and ion exchange processes, each of which have their disadvantages.

Known biological processes consists of contacting (e.g. in a reactor) the potable water to be denitrated with microorganisms capable of reducing nitrates. See, Denitrification biologique. Usine de Traitement d'Eragny/-Oise (Philipot J. M., Chaffange F., Pascal O., Water Supply (1985) 3:93-98). When using a heterotrophic biological reaction, organic carbon (e.g. acetic acid, methanol or ethanol) must be added to the potable water. These reagents cannot be consumed. They must, therefore, be carefully measured since an accidental excess of organic reagents would render the water unsuitable for consumption. Moreover, the biological reduction reaction leads to the depletion of dissolved oxygen.

The constraints imposed by biological process also lead to costly after-treatment following the biological reaction. Such treatment include filtration to eliminate biomass which is in the water and reoxygenating the water produced. In addition, following a biological process, water may contain bacteria which demands chlorination to disinfect it. Moreover, use of biological processes present a high risk of particularly noxious nitrite contamination which renders water unsuitable for drinking. For example, since the reduction reaction in the biological process is performed in several stages, i.e. $NO_3^- \rightarrow NO_2^- \rightarrow NO_2O \rightarrow N_2$, in the event of an incomplete reaction, there is a great risk of nitrites in the water.

Known ion exchange processes use gel or macroporous ion exchangers of an active quaternary ammonium group. The quaternary ammonium group comes from, for example trimethylamine or dimethylethanolamine. See, the "Carix Process" (Hoell W. H., Kretzschmar W., Hagen K., GIT Fachz Lab (1986) 30(4):307-312, 314) and the "Elimination of nitrates by the nitracycle process in the production of potable water" (Deguin A., Eau Industrie et Nuisances (1986) 99:36-40).

These ion exchangers are in the chloride form and thus exchange the chloride ions of the resins against the nitrate ions in the water. The relative affinity of these exchangers are as follows: $HCO_3^- < Cl^- < NO_3^- < SO_4^{--}$. It therefore follows that the sulphate ions in the water will be fixed at the same time as the nitrate ions and, consequently, the useful capacity of the exchanger for nitrates will become much weaker as the sulphate concentration in the water increases. A further drawback is that the sulphate and nitrate ions displace the resin's chloride ion which produces water rich in chlorides which can cause corrosion problems in the pipework or, if the chloride content exceeds the advised standard (EEC standard being 200 mg/l chloride), make the water non-potable.

Moreover, the regeneration of exchangers is constantly carried out using large amounts of sodium chloride solution which contributes to pollution. In addition, nitrates fixed by the resin will be freed during the regeneration process and will also be discharged into the environment.

From the foregoing, it can be seen that the use of ion exchange does not change the overall quantity of nitrates discharged into the environment and, therefore, even if the short term problem of producing potable water is resolved, ion exchange does not solve the long term problem of environmental pollution.

SUMMARY OF INVENTION

The invention is directed to the selective removal of nitrates from water using a combination of both ion exchange and biological processes which corrects the disadvantages of each. In contrast to the existing prior art processes, no additional pollution is created and the drawbacks of the traditional biological processes are avoided while also saving money.

The process of the subject invention is characterized by: (1) passing water or an aqueous solution through an ion exchanger containing a strong base anion resin having preferential affinity for $NO_3^-$ than for $SO_4^{--}$, this resin having a polystyrenic matrix with quaternary ammonium groups $-NR_1R_2R_3^+$, in which $R_1$, $R_2$ and $R_3$ are identical or different and each represents a $C_1$-$C_6$ alkyl group, a $C_1$-$C_3$ hydroxyalkyl group or two of the symbols $R_1$ to $R_3$, together with the nitrogen atom, form a nitrogen heterocycle selected from pyrrolidino, pperidino, morpholino or thiomorpholino, the resin being converted into sulphate and bisulphate form, in order to obtain potable water; (2) the resin is regenerated by an aqueous solution containing sulphate ions and, if necessary, after neutralization; (3) the effluent obtained is treated by heterophilic denitrifying bacteria in the presence of an organic nutrient for the bacteria.

DETAILED DESCRIPTION OF INVENTION

The object of the process of the invention is to eliminate the nitrates in water or aqueous solutions by the combination of an ion exchange process and a biological process. The invention comprises 1) passing water or an aqueous solution through an ion exchanger containing a strong base anion resin having a preferential affinity for $NO_3^-$ than $SO_4^{--}$, this resin having a polystyrenic matrix with quaternary ammonium groups $-NR_1R_2R_3^+$, in which $R_1$, $R_2$ and $R_3$ are identical or different and each represents a $C_1$-$C_6$ alkyl group, a $C_1$-$C_3$ hydroxyalkyl group, or two of the symbols $R_1$ to $R_3$, together with the nitrogen atom, form a nitrogen heterocycle selected from pyrrolidino, piperidino, morpholino or thiomorpholno, the resin being converted into sulphate and bisulphate form in order to obtain potable water; 2) the resin is regenerated by an aqueous solution containing sulphate ions and, if necessary, after neutralization; 3) the effluent obtained is treated by heterotrophic denitrifying bacteria in the presence of an organic nutrient for the bacteria.

The ion exchanger used in the invention is different from the prior art resins described above since it is specific for nitrates having the following affinities: $HCO_3^- < Cl^- < SO_4^{--} < NO_3^-$. According to the invention, resins containing ammonium groups derived from triethylamine, tripropylamine, tributylamine or N-methylmorpholine can be used. Resins containing tetriethylammonium groups (formula $-NR_1R_2R_3^+$ where $R_1=R_2=R_3=C_2H_5$) are preferred.

One feature of the invention consists of making one of the selective exchangers work in the sulphate form. In contrast to the conventional ion exchange process n the chlorde form, the evident advantages are that the chlorde content of the water produced is not changed and the increase of sulphate ions is limited to only the nitrate-sulphate exchange, i.e. it is generally small. The selective resin is regenerated by a sulphate or by sulfuric acid.

Another feature of the invention is that the regeneration eluent containing nitrates fixed by the selective resin is subjected to a biological purification in order to transform the matrix nitrates (step 3 above). As this concerns residual water, it is not necessary to take all the precautions that must be taken in the case of biological treatment of potable water and the process will be much simpler and thus less costly.

Where a sulphate is used to regenerate the selective resin, the biological treatment gives no particular problem, the pH being around 7. However, the concentration of sulphate in the eluent (regeneration and rinsing water) must not be too high (less than 35 g/l) in order to avoid an inhibition in the biological reaction. An aqueous solution, containing 3-30 g/l of sulphate ions can be used for regeneration.

Where sulfuric acid is used as the regenerant for the selective resin, two methods can be followed One uses relatively concentrated sulfuric acid, 0.5-2N, e.g. 1N. In this case an excess of acid needs to be used to correctly regenerate the selective resin. The regeneration eluent will thus be acid and must therefore be neutralized before the beginning of the biological treatment. During neutralization with lime, for example, insoluble calcium sulphate precipitates and after decantation or separation, one can destroy the nitrates by biological reaction. If the nitrate concentration in the eluent is large, the eluent can be recycled in a biological reactor for several hours until the nitrate content is sufficiently low. Diluted sulfuric acid can also be used, for example 0.05-0.5N, preferably 0.1N. The interesting fact concerning this variant is that the affinity of strong base resins for the sulphate ion increases as the sulphate ion concentration decreases in the regenerant solution. Consequently, with a dilute sulfuric acid regenerated solution it is possible to regenerate the selective resin with less acid. After neutralization with lime, the regeneration eluent will have a weaker nitrate concentration, which will make the biological treatment easier. The biological treatment consists of putting the eluent, neutralized if necessary in contact with a denitrifying bacteria belonging to the Pseudomonas or Agrobacterum groups, e.g. a denitrifying Pseudomonas. This treatment can be carried out in a biological reactor, with a pH between about 6 and 9 and concentration of $10^4$ to $10^5$ bacteria/ml. If desired, the $NO_3^-$ content can be reduced to 2-4 mg/l.

The examples below are given to demonstrate the invention:

EXAMPLE NO. 1

1 liter of Purolite A520E (resin made by the company, Purolite International Ltd) is introduced into a 120×5.5 cm column. It is a macroporous type resin, with a polystyrene matrix with triethylammonium groups, in the chloride form. Its particle size is 0.3-2.1 mm and its total exchange capacity is 1.0 eq/l.

This resin is totally converted into the sulphate form using 10 l of 1N sulfuric acid.

| Water, with the following analysis is treated: | |
| --- | --- |
| Alkalinity | 2.5 meq/l |
| Sulphate | 3 meq/l |
| Chloride | 1.5 meq/l |
| Nitrate | 1.3 meq/l (= 80.6 mg/l) |

After saturating the resin, it is regenerated using a countercurrent process, the direction of the acid is opposite to that of the water to be treated, with 1.5 l of 1N sulfuric acid at 1.5 l per hour. After dosing with acid the resin is first rinsed with 1 l of soft water at 2 l per hr., then 5 l of hard water at 10 l per hour.

All of the water used, (i.e. the regeneration eluent) is about 7.5 l and is kept aside.

After three "running in" cycles (exhaustion and regeneration), 305 l of water containing less than 5 mg/l of nitrates is produced, the same chloride concentration as the "entry" water and a sulphate content slightly higher (216 mg/l=4.5 meq) to that of the "entry" water, and less than the maximum content allowable (250 mg/l in $SO_4^{--}$).

If the denitrated water thus obtained is mixed in the proportion of 50% with non-treated water, 610 l of potable water is obtained containing less than 43 mg/l of nitrates, conforming to current legislation (less than 50 mg/l).

The regeneration eluent is neutralized with 60 g of lime, which causes a calcium sulphate precipitation. After decantation and filtration, a carbonated element is added to the regeneration eluent (0.45 g/g of $NO_3^-$ is about 13 ml of ethanol) as well as a small amount of phosphoric acid (0.15 g/cycle).

The regeneration eluent is immediately put in a bacteria vessel where it is recycled to reduce the nitrogenous nitrates by the action of a denitrifying Pseudomonas bacteria. This can then be put in the effluent with no other treatment, since the $NO_3^-$ content is less than 25 mg/l.

EXAMPLE NO. 2

Example 1 is followed except for the regeneration which is carried out counter-current with 10 l of 0.1N sulfuric acid at 5 l/hr. Rinsing is carried out as in Example 1. About 16 l of regeneration eluent is obtained which is treated as in Example 1. After three "running in" cycles 33 l of water containing less than 5 mg/l of nitrates is produced, which can be mixed with 330 l of raw water to produce 660 l of potable water.

We claim:

1. A process to eliminate nitrates from water or aqueous solution, which process comprises:
   a) passing nitrate-containing water or aqueous solution through a strong base anion exchange resin having a cation portion and having the following affinities: $HCO_3^- < Cl^- < SO_4^{--} < NO_3^-$, said resin having a polystyrenic matrix with quaternary ammonium groups $-NR_1R_2R_3^+$ in which $R_1$, $R_2$ and $R_3$ are identical or different and each represents a $C_1$-$C_6$ alkyl group or a $C_1$-$C_3$ hydroxy alkyl group or two of the symbols $R_1$-$R_3$, together with the nitrogen atom, form a heterocycle selected from the group consisting of pyrrolindino, piperidino, morpholino, and thiomorpholino, the resin being in the sulphate or bisulsphate form to obtain 1) potable water and 2) the strong anion exchange resin in the nitrate form;
   b) regenerating the strong anion exchange resin in the nitrate form to form the strong anion exchange resin in the sulphate or bisulphate form, which regeneration comprises the step of contacting the resin in the nitrate form with an aqueous solution containing sulphate or bisulfate anions to produce the strong anion exchange resin in the sulphate or bisulphate form and an acidic aqueous solution containing nitrates; and
   c) treating the nitrate-containing solution produced by the regeneration process with heterotropic denitrifying bacteria in the presence of an organic nutrient for said bacteria.

2. The process of claim 1, in which said resin contains triethylammonium groups.

3. The process of claim 1, wherein the resin is regenerated with an aqueous sulfate solution containing 3 to 30 g of $SO_4^{--}$ per liter.

4. The process of claim 1, wherein the resin is regenerated with 0.5 to 2N of sulfuric acid.

5. The process of claim 1, wherein the acidity of the nitrate-containing solution is neutralized with lime.

6. The process of claim 1, wherein the cation portion of the strong base anion exchange resin is made up of the polystyrenic matrix attached to a member of the group consisting of triethylamine, tripropylamine, tributylamine, and N-methylmorpholine.

7. The process of claim 1, wherein the heterotropic denitrifying bacteria are members of the genus Pseudomonas or Agrobacterium.

* * * * *

UNITED STATES PATENT AND TRADEMARK OFFICE
CERTIFICATE OF CORRECTION

PATENT NO.  : 5,062,957
DATED       : November 5, 1991
INVENTOR(S) : BERREBY

It is certified that error appears in the above-identified patent and that said Letters Patent is hereby corrected as shown below:

Column 5,

Claim 1, line 6, delete "$SO_4{}^{--}$" and insert --$SO_4{}^{----}$--.

Signed and Sealed this

Twentieth Day of April, 1993

Attest:

MICHAEL K. KIRK

*Attesting Officer*    Acting Commissioner of Patents and Trademarks